US010213882B2

(12) United States Patent
Desreumaux et al.

(10) Patent No.: US 10,213,882 B2
(45) Date of Patent: Feb. 26, 2019

(54) METHOD FOR REPAIRING A FAN CASING

(71) Applicant: SAFRAN AIRCRAFT ENGINES, Paris (FR)

(72) Inventors: Antoine Patrice Marie Desreumaux, Guignes (FR); Patrick Jean-Louis Reghezza, Vaux le Pénil (FR); Sébastien Marc Jean-Michel Perez, Heyrieux (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/536,408

(22) PCT Filed: Dec. 16, 2015

(86) PCT No.: PCT/FR2015/053536
§ 371 (c)(1),
(2) Date: Jun. 15, 2017

(87) PCT Pub. No.: WO2016/097597
PCT Pub. Date: Jun. 23, 2016

(65) Prior Publication Data
US 2017/0348808 A1  Dec. 7, 2017

(30) Foreign Application Priority Data
Dec. 16, 2014 (FR) ...................................... 14 62472

(51) Int. Cl.
*B23P 6/02* (2006.01)
*B23P 6/00* (2006.01)
(Continued)

(52) U.S. Cl.
CPC .............. *B23P 6/002* (2013.01); *F01D 25/24* (2013.01); *F04D 29/526* (2013.01);
(Continued)

(58) Field of Classification Search
CPC .... B23P 6/002; B23P 2700/01; F04D 29/526; F04D 29/38; F05D 2220/323;
(Continued)

(56) References Cited

U.S. PATENT DOCUMENTS 5,431,532 A * 7/1995 Humke .................. F01D 21/045
415/9
5,486,086 A * 1/1996 Bellia .................... F01D 21/045
415/9
(Continued)

FOREIGN PATENT DOCUMENTS

FR   2 973 845 A1   10/2012
GB   2 455 063 A    6/2009

OTHER PUBLICATIONS

International Search Report as issued in International Patent Application No. PCT/FR2015/053536, dated Mar. 31, 2016.
(Continued)

*Primary Examiner* — Eldon T Brockman
(74) *Attorney, Agent, or Firm* — Pillsbury Winthrop Shaw Pittman LLP

(57) ABSTRACT

A method for repairing a fan casing in which the inner surface is damaged, includes attaching a reinforcement element to the fan casing, the reinforcement element being attached to the outer surface of the fan casing opposite the damage.

10 Claims, 3 Drawing Sheets

(51) Int. Cl.
*F01D 25/24* (2006.01)
*F04D 29/52* (2006.01)
*F02K 3/06* (2006.01)
*F04D 29/38* (2006.01)

(52) U.S. Cl.
CPC ............ *B23P 2700/01* (2013.01); *F02K 3/06* (2013.01); *F04D 29/38* (2013.01); *F05D 2220/323* (2013.01); *F05D 2230/80* (2013.01); *F05D 2250/12* (2013.01); *F05D 2250/141* (2013.01); *F05D 2250/21* (2013.01); *F05D 2250/232* (2013.01); *F05D 2300/121* (2013.01); *F05D 2300/133* (2013.01); *F05D 2300/175* (2013.01); *Y02T 50/672* (2013.01)

(58) Field of Classification Search
CPC ........... F05D 2250/141; F05D 2250/12; F05D 2300/133; F05D 2300/175; F05D 2300/121; F05D 2230/80; F02K 3/06
See application file for complete search history.

(56) References Cited

U.S. PATENT DOCUMENTS

| | | | | |
|---|---|---|---|---|
| 6,206,067 | B1* | 3/2001 | Kociemba | B29C 43/3642 156/285 |
| 6,290,455 | B1* | 9/2001 | Hemmelgarn | F01D 21/045 415/173.4 |
| 7,744,709 | B2* | 6/2010 | Dierberger | B23K 31/00 148/521 |
| 7,981,519 | B2* | 7/2011 | Holland | B29C 73/06 29/402.11 |
| 8,016,543 | B2* | 9/2011 | Braley | F01D 21/045 415/173.4 |
| 8,371,009 | B2* | 2/2013 | Xie | B29C 73/04 29/402.09 |
| 8,403,624 | B2* | 3/2013 | Xie | B29C 70/086 415/173.1 |
| 8,986,797 | B2* | 3/2015 | Xie | F01D 21/045 415/119 |
| 2006/0013681 | A1 | 1/2006 | Cardarella | |
| 2008/0253883 | A1* | 10/2008 | Pool | F01D 21/045 415/200 |
| 2009/0067979 | A1* | 3/2009 | Braley | F01D 21/045 415/9 |
| 2009/0258185 | A1* | 10/2009 | Holland | B29C 73/06 428/116 |
| 2012/0034076 | A1* | 2/2012 | Xie | F01D 21/045 415/200 |
| 2012/0125523 | A1* | 5/2012 | Dupre | B23P 6/005 156/98 |
| 2013/0082088 | A1 | 4/2013 | Dighe et al. | |

OTHER PUBLICATIONS

International Preliminary Report on Patentability and then Written Opinion of the International Searching Authority as issued in International Patent Application No. PCT/FR2015/053536, dated Jun. 20, 2017.

* cited by examiner

METHOD FOR REPAIRING A FAN CASING

CROSS-REFERENCE TO RELATED APPLICATIONS

This is the U.S. National Stage of PCT/FR2015/053536, filed Dec. 16, 2015, which in turn claims priority to French Patent Application No. 1462472, filed Dec. 16, 2014, the entire contents of all applications are incorporated herein by reference in their entireties.

TECHNICAL FIELD OF THE INVENTION

The invention relates to a method for repairing a fan casing of an aircraft engine. As a non-restrictive example, the method for repairing a fan casing applies to fan casings used in aircraft engines of the CFM56-7B type.

TECHNOLOGICAL BACKGROUND OF THE INVENTION

As illustrated in FIG. 1, an aircraft engine 1 habitually includes a low-pressure compressor 2 fitted with a compressor shaft 3 surrounded by a fan casing 4 and an intermediate casing 5. Fan casing 4 in particular retains fan blades 6 and also fragments of fan blade 6. When a foreign body comes into collision with a fan blade 6 it can be damaged. When such damage occurs blade fragments can be detached from rotating blade 6 and, under a centrifugation effect, be displaced such that they are in contact with the inner surface of fan casing 4. Such damage can also be due to vibratory phenomena.

More specifically, as illustrated in FIG. 2, this type of fan casing 4 habitually has three separate parts 7, 8, 9, which are dimensioned so as to contain each blade fragment in the event of loss of blade 6. When blade 6 is lost the upstream portion 7 and downstream portion 9, which are less thick, respectively contain the blade tip and the blade root whereas central portion 8 (called the containment portion) enables the higher-energy blade fragments, which have been displaced under centrifugal forces, to be contained. Thus, during the lifetime of an aircraft engine 1 damage of the impact type appears on fan blade 4, and it is must be guaranteed that it can resist such damage. With the aim of improving the lifetime of fan casing 4 it is possible to use fan casings 4 with a thicker containment area.

But since this thickening started to be applied in 2013 the majority of aircraft engines 1 sold before this time do not have such thickening. Consequently, a large quantity of casings 4 are out of service after damage has been observed. Such thickening also increases the total mass of the aircraft fitted with this fan casing, and consequently increases fuel consumption.

GENERAL DESCRIPTION OF THE INVENTION

The invention offers a solution to the above-mentioned problems, by proposing a method for repairing a fan casing the inner surface of which has been damaged, where the repair method enables the lifetime of the fan casings to be increased, whilst having a limited impact in terms of mass.

One aspect of the invention relates to a method for repairing a fan casing the inner surface of which is damaged, where the said method includes a step of attaching a reinforcing member to the fan casing, where the said reinforcing member is attached to the outer surface of the fan casing, opposite the location of the damage.

The term "inner surface" is understood to mean the inner peripheral surface of the fan casing, and the term "outer surface" is understood to mean the outer peripheral surface of the fan casing.

In other words, the repair made by means of the method according to the invention takes the form of a reinforcing member (or patch) attached to the outer surface of the fan, i.e. opposite the location of damage in the inner surface. This reinforcing member absorbs the stresses (traction and shearing) on the outer surface, and provides additional local thickness in the area of the damaged portion. This reinforcing member improves the mechanical characteristics of the fan casing. In addition, by attaching this reinforcing member to the outer surface the constraints relating to repair of the inner surface, which are, in particular, compliance with the operating clearances and the complexity of the repair, can be avoided.

The method according to the invention therefore allows a simple repair to be made on the outer surface of the fan casing, where this repair enables the initial mechanical properties of the fan casing the inner surface of which has been damaged to be restored.

The method according to the invention is also applicable to all engine models (indiscriminately on an aluminium, titanium, steel or even composite casings).

Furthermore, since there is no modification of the inner surface of the fan casing the operating clearances are not modified.

The reinforcing member can also be adapted for all types of damage and all dimensions.

In addition, in comparison with fan casings with greater thickness than is proposed by the state of the art, the mass gain is substantial since the reinforcing member allows local repair of the damage.

Moreover, the method of repair according to the invention prevents scrappage of fan casings considered as not acceptable due to the damage present on the inner surface.

In addition to the characteristics mentioned in the preceding paragraph, the method of repair of a fan casing according to the invention may have one or more of the following possible additional characteristics, considered individually or in technically possible combinations:

In a non-restrictive implementation of the method of repair in accordance with the invention, the method includes a prior step of dimensioning of the reinforcing member.

In a non-restrictive implementation of the method of repair in accordance with the invention, the step of dimensioning of the reinforcing member is accomplished by estimating a cracking zone originating in the inner surface and on the perimeter of the damage, and growing wider as it propagates in the direction of the outer surface to create, on the outer surface of the fan casing, an outer cracking area, where the area of the reinforcing member which is to be attached to the outer surface of the fan casing must be at least equal to the outer cracking area.

Such dimensions of the reinforcing member enable the repaired fan casing to be given mechanical properties similar to the mechanical properties of an undamaged fan casing.

In a non-restrictive implementation of the method of repair in accordance with the invention, the step of dimensioning of the reinforcing member is accomplished by estimating a cracking zone originating in the inner surface and on the perimeter of the damage, and growing wider as it propagates in the direction of the outer surface to create, on the outer surface of the fan casing, an outer cracking surface, where the area of the reinforcing member which is to be attached to the outer surface of the fan casing must be equal to the outer cracking area. Such dimensions of the reinforcing member enable the repaired fan casing to be given mechanical properties similar to the mechanical properties of an undamaged fan casing, and also does not increase the weight of the fan casing significantly, since the reinforcing member's dimensions are small.

In a non-restrictive implementation of the method of repair in accordance with the invention, the cracking zone originates in the inner surface and on the perimeter of the damage, and grows wider as it propagates in the direction of the outer surface with a propagation angle a of between 40 and 50 degrees.

In a non-restrictive implementation of the method of repair in accordance with the invention, the thickness of the reinforcing member is equal to at least 1.5 times the depth of the damage.

In a non-restrictive implementation of the method of repair in accordance with the invention, the reinforcing member is attached to the outer surface of the fan casing by welding, riveting or bonding.

Another aspect of the invention relates to a fan casing with:
damage located on the inner surface of the fan casing, and
a reinforcing member attached to the outer surface of the fan casing, opposite the damage location.

In a non-restrictive implementation of the method of repair in accordance with the invention, the reinforcing member is made from aluminium, Inconel or titanium.

In a non-restrictive implementation of the method of repair in accordance with the invention, the shape of the reinforcing member is rectangular, circular or elliptical.

BRIEF DESCRIPTION OF THE FIGURES

The figures are presented as an indication only, and are not restrictive of the invention in any manner. The figures show.

DETAILED DESCRIPTION OF AT LEAST ONE IMPLEMENTATION OF THE INVENTION

Unless otherwise stated, a given element appearing in different figures has a single reference.

Figure 1:
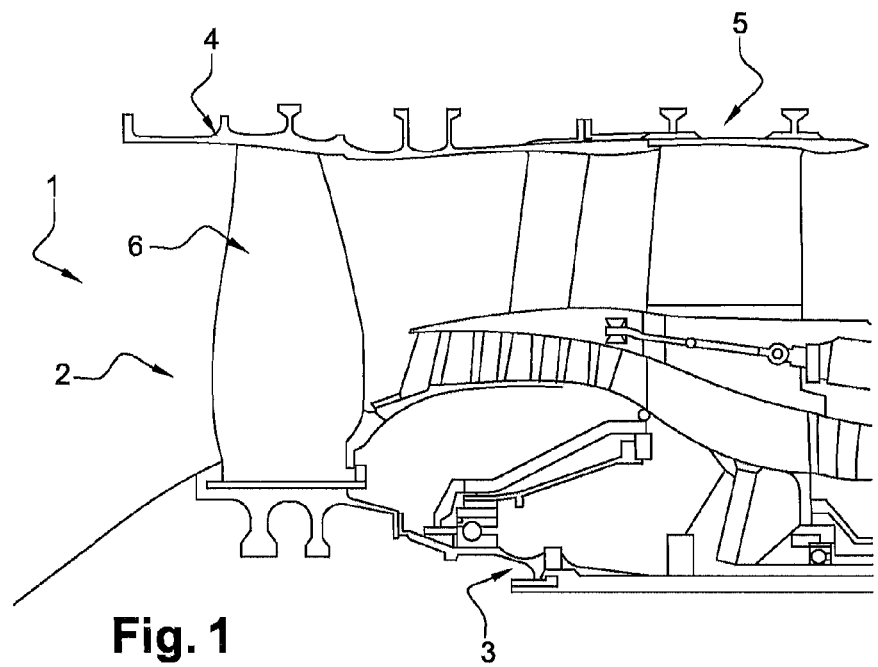
In FIG. 1, a diagrammatic representation of an aircraft engine fitted with a fan casing according to the state of the art.
Figure 2:
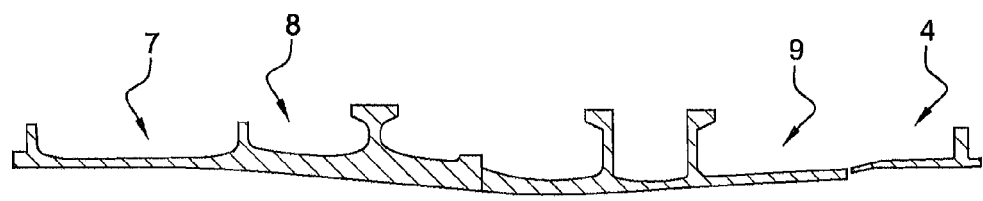
In FIG. 2, an enlargement of a portion of the fan casing illustrated in FIG. 1.
Figure 3:
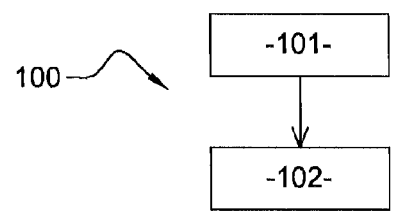
In FIG. 3, a block diagram of the steps of a method for repair of a fan casing in accordance with the invention.

FIG. 3 represents the steps of method 100 for repair of a fan casing according to a non-restrictive implementation of the invention.

Figure 4:
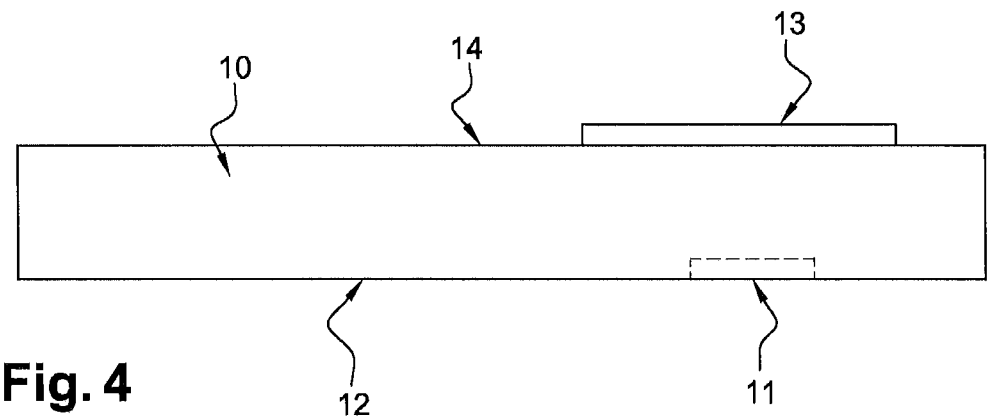
In FIG. 4, a portion of a damaged fan casing and a reinforcing member.

For reasons of clarity FIG. 4 illustrates diagrammatically only a portion of fan casing 10 with damage 11, for example of the impact type, in its inner surface 12. This FIG. 4 also illustrates a reinforcing member 13 in accordance with the one used by repair method 100. Reinforcing member 13 is attached to outer surface 14 of fan casing 10.

Method 100 for repair of fan casing 10 includes a step 101 of dimensioning of a reinforcing member 13. During a subsequent step 102, dimensioned reinforcing member 13 is attached to outer surface 14 of fan casing 10 opposite damage 11.

In a non-restrictive implementation, step 101 of dimensioning of reinforcing member 13 is accomplished by estimating a cracking area. To accomplish this, a cracking zone is first determined.

Fan casing 10 is indeed subject to shearing stresses when it is in operation. Thus, when fan casing 10 has damage 11 on inner surface 12, shearing stresses are applied in the area of damage 11. Under the effect of these stresses damage 11 tends to propagate in the direction of outer surface 14 of fan casing 10. This propagation of damage 11 forms a cracking zone.

Thus, when a shearing stress applied to damage 11 is simulated it is possible to predict the cracking zone.

Figure 5A:
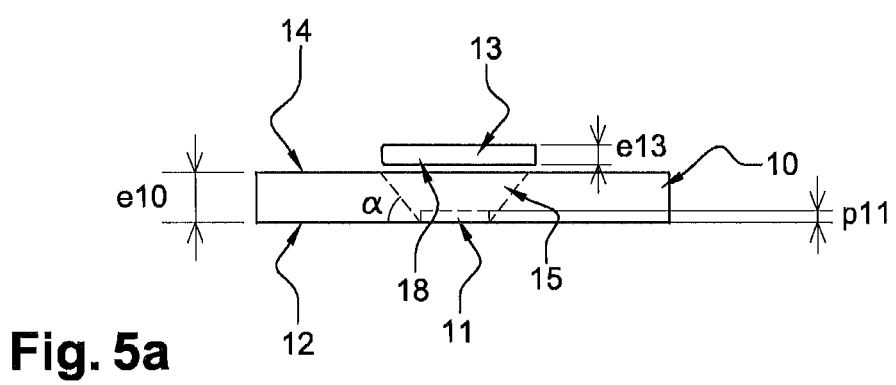
In FIG. 5A, a profile view of a portion of a damaged fan casing, a cracking zone and a reinforcing member, In FIG. 5B, a top view of a portion of the fan casing represented in FIG. 5A and an outer cracking area. For reasons of clarity FIG. 5B does not represent the reinforcing member illustrated in FIG. 5A, In FIG. 6, a fan casing including a reinforcing member.

FIG. 5A illustrates such a cracking zone 15, which creates on outer surface 14 of fan casing 10 an outer cracking area S15. More specifically, cracking zone 15 originates in inner surface 12 and on the perimeter of damage 11, and grows wider as it propagates in the direction of outer surface 14, to create outer cracking area S15 (FIG. 5B) located on outer surface 14 of fan casing 10. Reinforcing member 13 is dimensioned in accordance with this outer cracking area S15. For example, area 18 of reinforcing member 13, which is to be attached to outer surface 14 of fan casing 10, is at least equal to outer cracking area S15. Reinforcing member 13 completely covers outer cracking area S15, such that the mechanical properties of fan casing 10 are similar to what they were before damage 11 appeared.

Figure 5B:
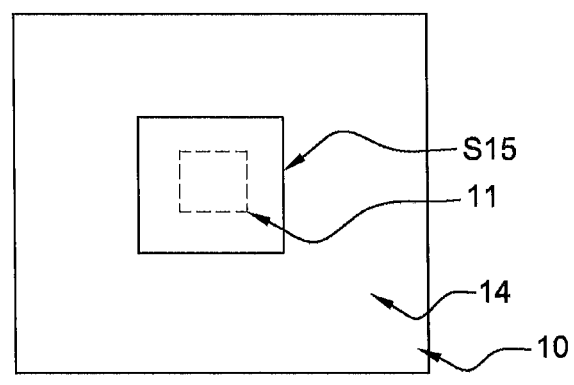

In a non-restrictive implementation illustrated in FIGS. 5A and 5B, cracking zone 15 originates in inner surface 12 and on the perimeter of damage 11, and grows wider as it propagates in the direction of outer surface 14 with a propagation angle a of 45 degrees. The propagation angle is measured between inner surface 12 and the peripheral surface of cracking zone 15.

In a non-restrictive manner, propagation angle a can be between 40 and 50 degrees.

The thickness of reinforcing member e13 can also be equal to 1.5 times depth p11 of damage 11.

In a non-restrictive example, the minimum thickness of reinforcing member 13 is 1 mm.

According to such an implementation, for a damage 11 which is 1 mm deep, thickness e13 of reinforcing member 13 is 1.5 mm.

To summarise, in the illustrated example described in detail using FIGS. 5A and 5B, in the case of a fan casing 10 with a thickness e10 of 22 mm, damage which has a depth p11 of 1 mm, and where the propagation of damage 11 occurs at a propagation angle a of 45 degrees, dimensioned reinforcing member 13 has an area 18, which must be brought into contact with outer surface 14 of the fan casing, which must be at least equal to outer cracking area S15, and which must be 1.5 mm thick.

Reinforcing member 13 is an added member which may be made, for example, of aluminium, a nickel-based alloy or titanium. This reinforcing member 13 may be, for example, square, rectangular or elliptical.

Method 100 for repairing a fan casing according to the invention also includes a step 102 of attaching reinforcing member 13 to fan casing 10. Reinforcing member 13 is attached to outer surface 14 of the fan casing, opposite impact 11.

Reinforcing member 13 may, for example, be attached to outer surface 14 of fan casing 10 by means of welding, riveting or bonding. It will be understood that those skilled in the art may propose other means of attaching reinforcing member 13 to outer surface 14 of fan casing 10 without however going beyond the scope of the invention.

Figure 6:
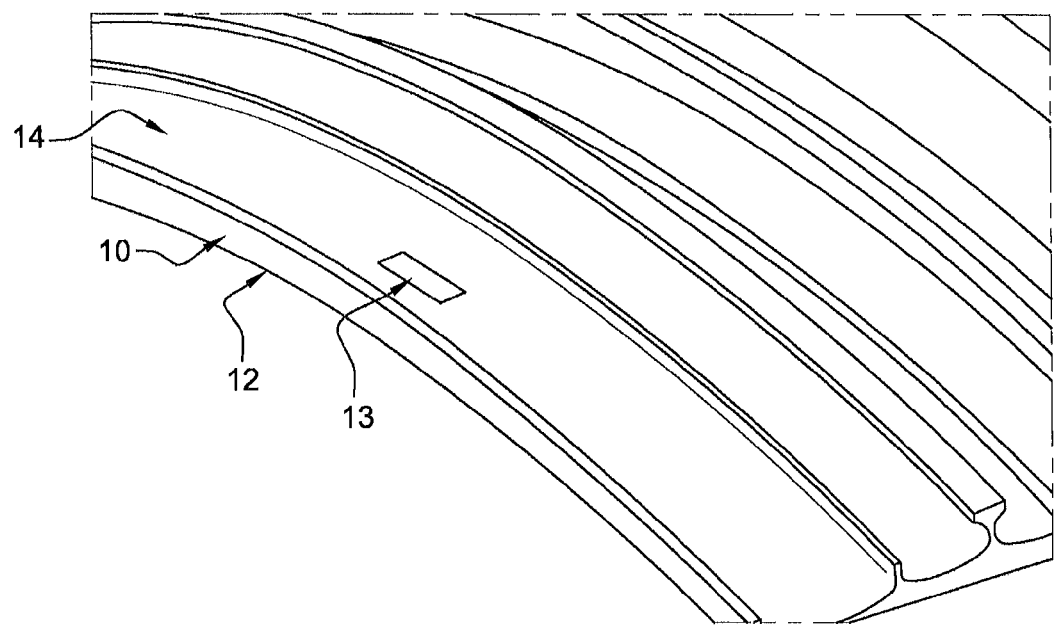

On aspect of the invention also relates to a fan casing 10, as illustrated in FIG. 6, which, on its inner surface 12, has damage 11. Fan casing 10 also has, on its outer surface 14, a reinforcing member 13 which is attached opposite damage 11.

This type of fan casing 10 has mechanical properties similar to a fan casing with an undamaged inner surface.

The invention claimed is:

1. A method for repairing a fan casing an inner surface of which is subject to damage, the method comprising attaching a reinforcing member to the fan casing having a damage on the inner surface, wherein the reinforcing member is attached to an outer surface of the fan casing, opposite a location of the damage.

2. The method for repairing a fan casing according to claim 1, further comprising, prior to said attaching, dimensioning the reinforcing member.

3. The method for repairing a fan casing according to claim 2, wherein the dimensioning of the reinforcing member is accomplished by estimating a cracking zone originating in the inner surface and on a perimeter of the damage and growing wider as the cracking zone propagates in a direction of the outer surface to create, on the outer surface of the fan casing, an outer cracking area, wherein an area of the reinforcing member which is to be attached to the outer surface of the fan casing is at least equal to the outer cracking area.

4. The method for repairing a fan casing according to claim 2, wherein the dimensioning of the reinforcing member is accomplished by estimating a cracking zone originating in the inner surface and on a perimeter of the damage and growing wider as the cracking zone propagates in a direction of the outer surface to create, on the outer surface of the fan casing, an outer cracking area; wherein an area of the reinforcing member which is to be attached to the outer surface of the fan casing is equal to the outer cracking area.

5. The method for repairing a fan casing according to claim 3, wherein the cracking zone originates in the inner surface and on the perimeter of the damage and grows wider as the cracking zone propagates in the direction of the outer surface with a propagation angle of between 40 and 50 degrees.

6. The method for repairing a fan casing according to claim 1 wherein the thickness of the reinforcing member is at least equal to 1.5 times a depth of the damage.

7. The method for repairing a fan casing according to claim 1 wherein the reinforcing member is attached to the outer surface of the fan casing by welding, riveting or bonding.

8. A fan casing subject to damage located on the inner surface of the fan casing and a reinforcing member attached to an outer surface of the fan casing and opposite a location of the damage said reinforcing member being dimensioned according to an estimation of a cracking zone originating in the inner surface and on the perimeter of the damage and growing wider as the cracking zone propagates in the direction of the outer surface to create, on the outer surface of the fan casing, an outer cracking area, wherein the area of the reinforcing member which is attached to the outer surface of the fan casing is at least equal to the outer cracking area.

9. The fan casing according to claim 8, wherein the reinforcing member is made of aluminum, Inconel, or titanium.

10. The fan casing according to claim 8, wherein a shape of the reinforcing member is rectangular, circular or elliptical.

\* \* \* \* \*